(12) United States Patent
Oomura et al.

(10) Patent No.: US 9,225,271 B2
(45) Date of Patent: Dec. 29, 2015

(54) SEMICONDUCTOR INTEGRATED CIRCUIT AND MOTOR DRIVING APPARATUS

(71) Applicant: Kabushiki Kaisha Toshiba, Minato-ku, Tokyo (JP)

(72) Inventors: Naoki Oomura, Fuji Shizuoka (JP); Kazunobu Nagai, Aichi Aichi (JP); Toshimitsu Aizawa, Yokohama Kanagawa (JP); Sadao Ikeda, Chigasaki Kanagawa (JP); Jun Sodesawa, Nerima Tokyo (JP); Hiroyuki Ishida, Yokohama Kanagawa (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/465,305

(22) Filed: Aug. 21, 2014

(65) Prior Publication Data
US 2015/0054437 A1    Feb. 26, 2015

(30) Foreign Application Priority Data

Aug. 23, 2013 (JP) .................... 2013-173741
Jul. 8, 2014 (JP) .................... 2014-140770

(51) Int. Cl.
*H02P 6/00* (2006.01)

(52) U.S. Cl.
CPC .................... *H02P 6/002* (2013.01)

(58) Field of Classification Search
CPC ....... H02P 6/10; H02P 27/08; H02P 23/0081; H02P 25/023; H02P 6/002; H02P 6/12; H02P 6/145; H02P 6/16; H02P 6/20; H02P 1/44; H02P 2209/07; H02P 23/0095; H02P 25/04; H02P 6/06; H02P 6/08

USPC ............ 318/400.05, 400.06, 400.22, 400.34, 318/400.35, 432, 434

See application file for complete search history.

(56) References Cited

U.S. PATENT DOCUMENTS

| | | | | |
|---|---|---|---|---|
| 4,447,771 A | * | 5/1984 | Whited | 318/661 |
| 4,617,597 A | * | 10/1986 | Lippel | 386/311 |
| 4,654,704 A | * | 3/1987 | Lippel | 380/216 |
| 4,716,347 A | * | 12/1987 | Fujimoto | 318/460 |
| 5,252,905 A | * | 10/1993 | Wills et al. | 318/807 |
| 5,793,623 A | * | 8/1998 | Kawashima et al. | 363/56.05 |
| 6,236,174 B1 | * | 5/2001 | White | 318/400.35 |
| 6,812,667 B2 | * | 11/2004 | Yasohara et al. | 318/599 |
| 7,053,572 B2 | * | 5/2006 | Yamamoto | 318/432 |

(Continued)

FOREIGN PATENT DOCUMENTS

| | | |
|---|---|---|
| JP | 07-337072 A | 12/1995 |
| JP | 09-215375 A | 8/1997 |

(Continued)

*Primary Examiner* — Paul Ip
(74) *Attorney, Agent, or Firm* — White & Case LLP

(57) ABSTRACT

A motor driving apparatus according to an embodiment includes a brushless motor. The motor driving apparatus includes a position sensor that outputs a position detection signal in synchronization with a phase of an induced voltage of a coil of the brushless motor. The motor driving apparatus includes a semiconductor integrated circuit that controls driving of the brushless motor by supplying a pseudo sine-wave driving voltage from an energization terminal to the coil of the brushless motor based on the position detection signal and a command signal that prescribes driving of the brushless motor.

20 Claims, 10 Drawing Sheets

(56) References Cited

U.S. PATENT DOCUMENTS

| | | | |
|---|---|---|---|
| 7,088,067 B2* | 8/2006 | Yamamoto et al. | 318/400.34 |
| 7,102,312 B2* | 9/2006 | Suzuki et al. | 318/400.05 |
| 7,313,005 B2* | 12/2007 | Azuma et al. | 363/41 |
| 7,443,257 B2* | 10/2008 | Demma | 331/116 M |
| 7,714,529 B2* | 5/2010 | Chen et al. | 318/712 |
| 7,852,017 B1* | 12/2010 | Melanson | 315/291 |
| 8,054,019 B2* | 11/2011 | Kallioniemi et al. | 318/400.22 |
| 8,198,852 B2* | 6/2012 | Aono et al. | 318/650 |
| 8,258,732 B2* | 9/2012 | Iwaji et al. | 318/400.11 |
| 2003/0090222 A1* | 5/2003 | Charleston | 318/254 |
| 2004/0007998 A1* | 1/2004 | Yasohara et al. | 318/437 |
| 2004/0155618 A1* | 8/2004 | Yamamoto | 318/434 |
| 2005/0248306 A1* | 11/2005 | Chen et al. | 318/712 |
| 2005/0285582 A1* | 12/2005 | Azuma et al. | 323/282 |
| 2006/0001389 A1* | 1/2006 | Suzuki et al. | 318/85 |
| 2006/0238260 A1* | 10/2006 | Demma | 331/10 |
| 2008/0297095 A1* | 12/2008 | Aono et al. | 318/650 |
| 2009/0200971 A1* | 8/2009 | Iwaji et al. | 318/400.11 |
| 2009/0322273 A1* | 12/2009 | Kallioniemi et al. | 318/503 |
| 2014/0030091 A1* | 1/2014 | Wu et al. | 416/1 |

FOREIGN PATENT DOCUMENTS

| | | |
|---|---|---|
| JP | 10-285982 A | 10/1998 |
| JP | 2000-278987 A | 10/2000 |
| JP | 2004-173360 A | 6/2004 |
| JP | 3663234 B2 | 6/2005 |
| JP | 3808583 B2 | 8/2006 |

* cited by examiner

SEMICONDUCTOR INTEGRATED CIRCUIT AND MOTOR DRIVING APPARATUS

CROSS-REFERENCE TO RELATED APPLICATION

This application is based upon and claims the benefit of priority from the prior Japanese Patent Application No. 2013-173741, filed on Aug. 23, 2013 and the prior Japanese Patent Application No. 2014-140770, filed on Jul. 8, 2014, the entire contents of which are incorporated herein by reference.

BACKGROUND

1. Field

Embodiments described herein relate generally to a semiconductor integrated circuit and a motor driving apparatus.

2. Background Art

A conventional motor driving apparatus generates a sine-wave signal from a sensor signal from a Hall element, performs pulse wave modulation (PWM) of the sine-wave signal, supplies the resulting signal to a bridge, and adjusts the phase of the sine-wave signal based on the result of determination of the polarity of the current.

DETAILED DESCRIPTION

Figure 1:
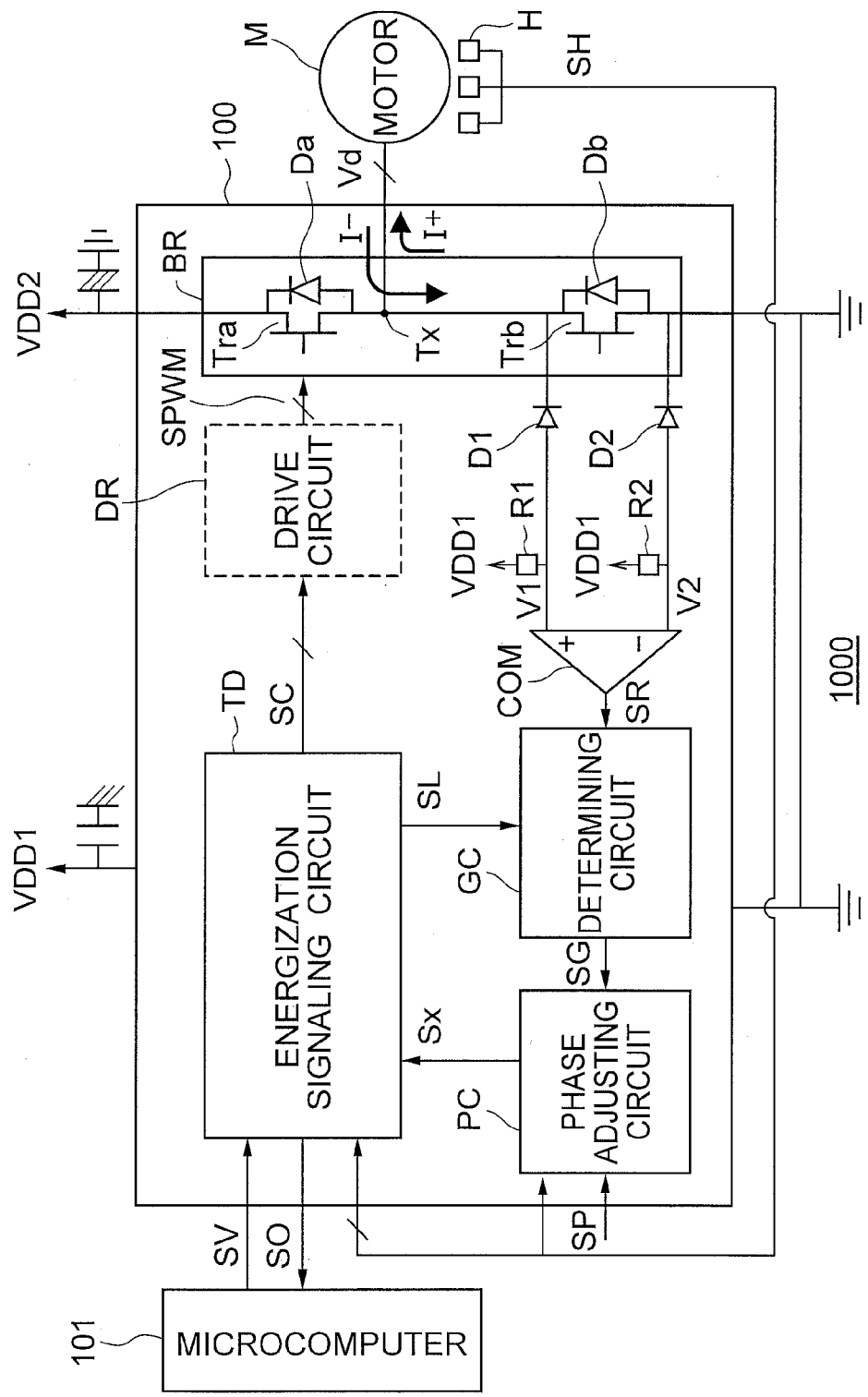
FIG. 1 is a diagram showing an example of a configuration of a motor driving apparatus 1000 according to a first embodiment.

A motor driving apparatus according to an embodiment includes a brushless motor. The motor driving apparatus includes a position sensor that outputs a position detection signal in synchronization with a phase of an induced voltage of a coil of the brushless motor. The motor driving apparatus includes a semiconductor integrated circuit that controls driving of the brushless motor by supplying a pseudo sine-wave driving voltage from an energization terminal to the coil of the brushless motor based on the position detection signal and a command signal that prescribes driving of the brushless motor.

The semiconductor integrated circuit includes energization signal circuit that outputs an energization signal that controls energization of the brushless motor. The semiconductor integrated circuit includes driving voltage outputting circuit that has a positive-side transistor connected to a direct-current power supply at a first end of a current path thereof and to the energization terminal at a second end of the current path thereof, a positive-side diode connected to the first end of the current path of the positive-side transistor at a cathode thereof and to the second end of the current path of the positive-side transistor at an anode thereof, a negative-side transistor connected to the energization terminal at a first end of a current path thereof and to a ground at a second end of the current path thereof and a negative-side diode connected to the first end of the current path of the negative-side transistor at a cathode thereof and to the second end of the current path of the negative-side transistor at an anode thereof, and controls the positive-side transistor and the negative-side transistor so that the positive-side transistor and the negative-side transistor are turned on and off in a complementary manner in response to the energization signal to supply the pseudo sine-wave driving voltage to the coil of the brushless motor from the energization terminal. The semiconductor integrated circuit includes a comparator that receives a first voltage that is based on a voltage at the first end of the current path of the negative-side transistor at a first input and a second voltage that is based on a voltage at the second end of the current path of the negative-side transistor at a second input and outputs a comparison result signal that is based on a result of comparison between the first voltage and the second voltage. The semiconductor integrated circuit includes determining circuit that determines a polarity of a motor current flowing through the negative-side transistor based on the comparison result signal and outputs a determination signal. The semiconductor integrated circuit comprises phase adjusting circuit that outputs a phase adjustment signal that adjusts a phase of the driving voltage based on the position detection signal and the determination signal.

In the following, an embodiment will be described with reference to the drawings.

First Embodiment

FIG. 1 is a diagram showing an example of a configuration of a motor driving apparatus 1000 according to a first embodiment.

As shown in FIG. 1, the motor driving apparatus 1000 includes a brushless motor "M", a semiconductor integrated circuit (controlling circuit) 100 and a position sensor "H" provided on the brushless motor "M".

In this embodiment, the brushless motor "M" is a three-phase brushless motor. The brushless motor "M" has a stator (not shown) provided with a W phase coil, a U phase coil and a V phase coil, and a rotor (not shown), for example. As an alternative, the brushless motor "M" may be an n-phase brushless motor ("n" represents an integer), such as a single-phase brushless motor and a two-phase brushless motor.

The position sensor "H" outputs a position detection signal "SH" synchronized with the phase of an induced voltage of a coil of the brushless motor "M". In FIG. 1, as an example, the brushless motor "M" is provided with three position sensors "H". The position sensors "H" are Hall elements or Hall ICs, for example. The number of position sensors "H" may be smaller than the number of phases of the brushless motor "M", although three Hall ICs or Hall elements are provided for three phases in this embodiment. In this case, three position detection signals "SH" are output in the case where the position sensors are Hall ICs, and six position detection signals "SH" are output in the case where the position sensors are Hall elements.

A microcomputer 101 is configured to output a command signal "SV" that prescribes driving of the brushless motor "M" to the semiconductor integrated circuit 100.

Based on the position detection signals "SH" and the command signal "SV" that prescribes driving of the brushless motor "M", the semiconductor integrated circuit 100 supplies a pseudo sine-wave driving voltage "Vd" to the coils of the brushless motor "M" from an energization terminal "Tx", thereby controlling driving of the brushless motor "M".

As shown in FIG. 1, the semiconductor integrated circuit 100 includes a phase adjusting circuit (phase adjusting means) "PC", an energization signaling circuit (energization signaling means) "TD", a drive circuit "DR", a bridge circuit (driving voltage outputting means) "BR", a comparator "COM", a determining circuit (determining means) "GC", a first resistor "R1", a second resistor "R2", a first diode "D1", and a second diode "D2".

Based on the position detection signals "SH" and a determination signal "SG" output from the determining circuit "GC" described later, the phase adjusting circuit "PC" outputs a phase adjustment signal "Sx" for adjusting the phase of the driving voltage "Vd".

The position adjusting circuit "PC" can directly control the phase adjustment signal "Sx" with a position controlling signal "SP" externally supplied thereto.

The energization signaling circuit "TD" outputs an energization signal "SC" for controlling energization of the brushless motor "M" based on the phase adjustment signal "Sx", the position detection signals "SH" and the command signal "SV".

The energization signaling circuit "TD" generates the sine-wave energization signal "SC" by reading sine-wave data from the phase adjustment signal "Sx", the position detection signals "SH" and the command signal "SV", for example. The sine-wave data can be three-phase modulated or two-phase modulated.

The energization signaling circuit "TD" outputs a revolution signal "SO" containing information on the presence or absence of a revolution of the brushless motor "M" and the number of revolutions, based on the position detection signals "SH".

The drive circuit "DR" outputs a pulse width modulation (PWM) control signal "SPWM" in response to the energization signal "SC" output from the energization signaling circuit "TD". More specifically, the drive circuit "DR" performs dead time processing of the energization signal "SC", converts the resulting signal into a PWM control signal "SPWM" at a required potential, and supplies the PWM control signal to the bridge circuit "BR".

The drive circuit "DR" generates each required potential with a bootstrap or charge pump.

The drive circuit "DR" may be omitted or included in the energization signaling circuit "TD". In that case, the energization signaling circuit "TD" performs part of the functionality of the drive circuit "DR" and performs PWM control on the bridge circuit "BR".

The bridge circuit "BR" is connected to a direct-current power supply "VDD2" at one end thereof and to a ground at another end thereof. The bridge circuit "BR" generates the three-phase driving voltage "Vd" for driving the brushless motor "M" from the direct-current power supply "VDD2". The bridge circuit "BR" supplies the three-phase driving voltage "Vd" to the brushless motor "M" in response to the PWM control signal "SPWM". The three-phase driving voltage described above makes a current flow through the three coils of different phases of the brushless motor "M", and the brushless motor "M" is driven.

As shown in FIG. 1, the bridge circuit "BR" has a positive-side transistor "Tra", a positive-side diode "Da", a negative-side transistor "Trb" and a negative-side diode "Db", for example.

The positive-side transistor "Tra" is connected to the direct-current power supply "VDD2" at one end (drain) of a current path thereof and to the energization terminal "Tx" at another end (source) of the current path thereof.

The positive-side diode "Da" is connected to the one end (drain) of the positive-side transistor "Tra" at a cathode thereof and to the another end (source) of the positive-side transistor "Tra" at an anode thereof.

The negative-side transistor "Trb" is connected to the energization terminal "Tx" at one end (drain) of a current path thereof and to the ground at another end (source) of the current path thereof.

The negative-side diode "Db" is connected to the one end (drain) of the negative-side transistor "Trb" at a cathode thereof and to the another source of the negative-side transistor "Trb" at an anode thereof.

The bridge circuit "BR" performs PWM control in response to the PWM control signal "SPWM" so that the positive-side transistor "Tra" and the negative-side transistor "Trb" are turned on and off in a complementary manner, and supplies the pseudo sine-wave driving voltage "Vd" from the energization terminal "Tx" to the coils of the brushless motor "M".

In this embodiment, since the brushless motor "M" is a three-phase brushless motor, the bridge circuit "BR" has three sets of a positive-side transistor "Tra" and a positive-side diode "Da", although not shown. The energization terminals "Tx" for the three sets are connected to the W phase coil, the U phase coil and the V phase coil, respectively.

The positive-side transistor "Tra" and the negative-side transistor "Trb" are MOS transistors or bipolar transistors. In particular, in the example shown in FIG. 1, the positive-side transistor "Tra" and the negative-side transistor "Trb" are nMOS transistors.

As shown in FIG. 1, the first resistor "R1" is connected to a control power supply "VDD1" at one end thereof and to a first input (non-inverting input terminal) of the comparator "COM" at another end thereof. The second resistor "R2" is connected to the control power supply "VDD1" at one end thereof and to a second input (inverting input terminal) of the comparator "COM" at another end thereof. The first diode "D1" is connected to the first input of the comparator "COM" at an anode thereof and to the one end (drain) of the negative-side transistor "Trb" at a cathode thereof.

A current flowing through the first diode "D1" assumes an extremely small value that is determined by the control power supply "VDD1" and the first resistor "R1". However, the withstand voltage of the first diode "D1" needs to have a characteristic substantially equivalent to a direct-current voltage.

The second diode "D2" is connected to the second input of the comparator "COM" at an anode thereof and to the another end (source) of the negative-side transistor "Trb" at a cathode thereof.

The second diode "D2" can have a lower withstand voltage than the first diode "D1". The second diode "D2" may be replaced with a resistor. The second diode "D2" is selected to have a saturation voltage approximately equal to that of the first diode "D1", taking into consideration the balance between the first diode "D1" and the second diode "D2" and the voltage variation of the control power supply "VDD1".

As shown in FIG. 1, the first input (non-inverting input terminal) of the comparator "COM" is connected to the one end (drain) of the negative-side transistor "Trb" via the first diode "D1", and the second input (inverting input terminal) of the comparator "COM" is connected to the another end (source) of the negative-side transistor "Trb" via the second diode "D2".

Therefore, the comparator "COM" receives, at the first input (non-inverting input terminal) thereof, a first voltage "V1" that is based on the voltage at the one end (drain) of the negative-side transistor "Trb", and receives, at the second input (inverting input terminal), a second voltage "V2" that is based on the voltage at the another end (source) of the negative-side transistor "Trb". The comparator "COM" outputs a comparison result signal "SR" that is based on a result of comparison between the first voltage "V1" and the second voltage "V2".

For example, when the negative-side transistor "Trb" is in an on state, if the motor current is of a positive polarity and flows from the negative-side transistor "Trb" to the energization terminal "Tx", the first voltage "V1" is lower than the second voltage "V2". In this case, the comparator "COM" outputs the comparison result signal "SR" at a "Low" level, for example.

On the other hand, when the negative-side transistor "Trb" is in the on state, if the motor current is of a negative polarity and flows from the energization terminal "Tx" to the negative-side transistor "Trb", the first voltage "V1" is equal to or higher than the second voltage "V2". In this case, the comparator "COM" outputs the comparison result signal at a "High" level, for example.

As described above, the comparison result signal "SR" output from the comparator "COM" corresponds to the polarity of the motor current.

The comparator "COM" can have a hysteresis characteristic to avoid a hunting phenomenon.

According to this embodiment, since the brushless motor "M" is a three-phase brushless motor, the arrangement of the comparator "COM", the first diode "D1", the second diode "D2", the first resistor "R1" and the second resistor "R2" is preferably provided for each of the three phases. However, in a case where the brushless motor "M" is used for a load having a high inertia, the arrangement described above can be provided only for one or two phases.

In a case where the arrangement is provided for each of a plurality of phases, the arrangements can share a resistor and a diode connected on the side of the another end (source) of the negative-side transistor "Trb".

The determining circuit "GC" determines the polarity of the motor current flowing through the negative-side transistor "Trb" and outputs the determination signal "SG" that is based on a result of the determination.

In particular, the determining circuit "GC" determines the polarity of the motor current flowing through the negative-side transistor "Trb" based on the comparison result signal "SR" output from the comparator "COM" during a period in which the negative-side transistor "Trb" is in the on state.

As shown in FIG. 1, the energization signaling circuit "TD" outputs a sampling signal "SL" that instructs to sample the comparison result signal "SR" during the period in which the negative-side transistor "Trb" is in the on state, for example. More preferably, taking into consideration the dead time of the PWM control signal "SPWM", the energization signaling circuit "TD" sets the sampling signal "SL" so as to instruct to sample the comparison result signal "SR" in the middle of the period in which the negative-side transistor "Trb" is in the on state.

The determining circuit "GC" samples the comparison result signal "SR" in response to the sampling signal "SL".

In a case where the sampled comparison result signal "SR" prescribes that the first voltage "V1" is lower than the second voltage "V2" (that is, the comparison result signal is at the "Low" level, for example), the determining circuit "GC" determines that the motor current is of the positive polarity and flows from the negative-side transistor "Trb" to the energization terminal "Tx".

On the other hand, in a case where the sampled comparison result signal "SR" prescribes that the first voltage "V1" is equal to or higher than the second voltage "V2" (that is, the comparison result signal is at the "High" level, for example), the determining circuit "GC" determines that the motor current is of the negative polarity and flows from the energization terminal "Tx" to the negative-side transistor "Trb".

The phase adjusting circuit "PC" obtains the phase of the motor current based on the determination signal "SG". More specifically, the phase adjusting circuit "PC" obtains the phase of the motor current from a zero crossing point at which the polarity of the motor current is inverted, for example.

The phase adjusting circuit "PC" also obtains the phase of the induced voltage of the coils of the brushless motor "M" based on the position detection signals "SH".

For example, in a case of increasing the efficiency of the brushless motor "M", the phase adjusting circuit "PC" outputs the phase adjustment signal "Sx" for adjusting the phase of the driving voltage "Vd" so that the phase of the motor current agrees with the phase of the induced voltage.

The energization signaling circuit "TD" outputs the energization signal "SC" responsive to the phase adjustment signal "Sx". In response to the energization signal "SC", the drive circuit "DR" performs PWM control on the bridge circuit "BR" with the PWM control signal "SPWM" to make the bridge circuit "BR" output the driving voltage "Vd" so that the phase of the motor current agrees with the phase of the induced voltage.

Further, in a case of high speed operation, the phase adjusting circuit "PC" outputs the phase adjustment signal "Sx" for adjusting the phase of the driving voltage "Vd" so that the phase of the motor current leads the phase of the induced voltage.

The energization signaling circuit "TD" outputs the energization signal "SC" responsive to the phase adjustment signal "Sx". In response to the energization signal "SC", the drive circuit "DR" performs PWM control on the bridge circuit "BR" with the PWM control signal "SPWM" to make the bridge circuit "BR" output the driving voltage "Vd" so that the phase of the motor current leads the phase of the induced voltage.

Figure 2:
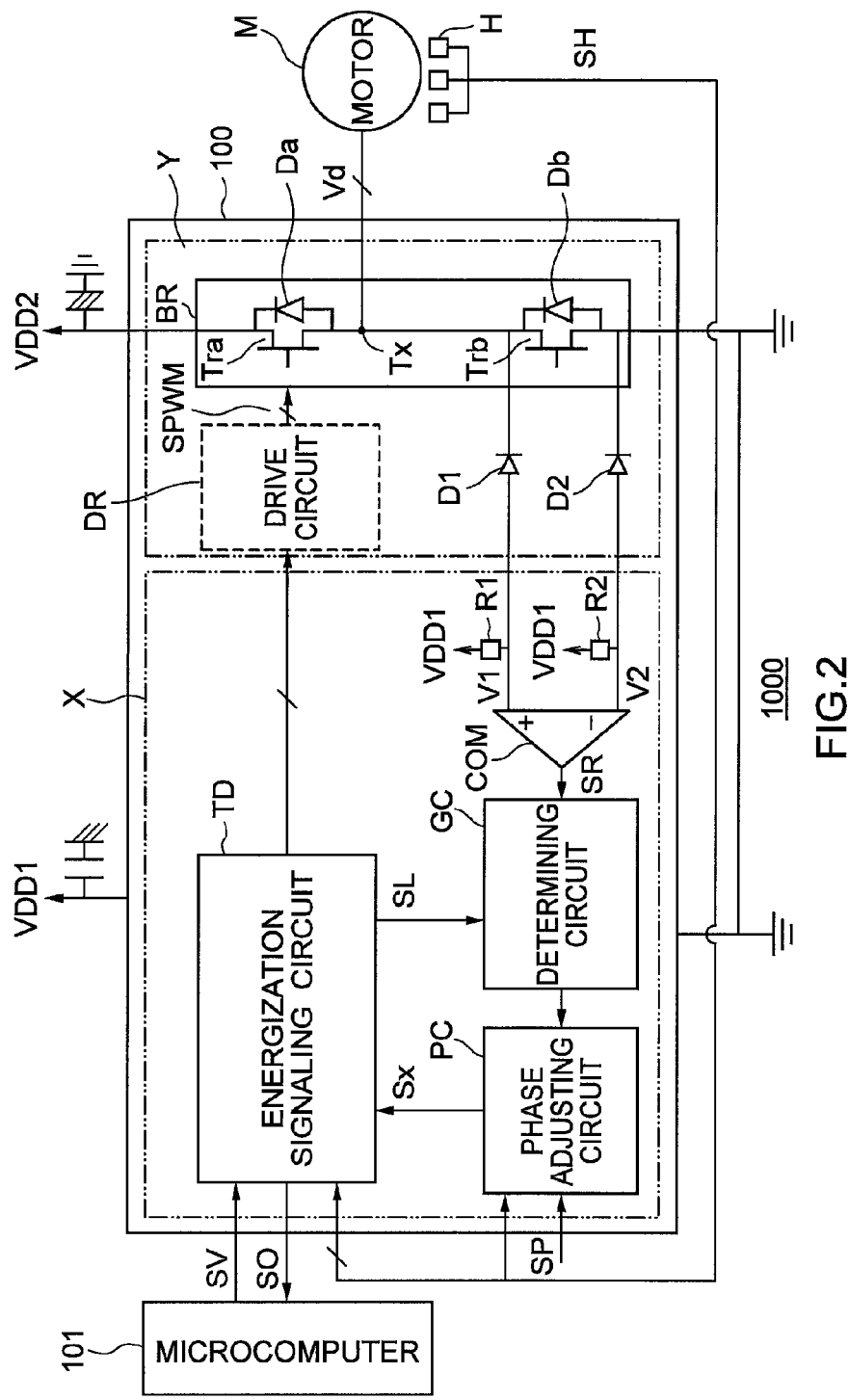
FIG. 2 is a diagram showing an example of division of power supply systems of the semiconductor integrated circuit 100 shown in FIG. 1.

FIG. 2 is a diagram showing an example of division of power supply systems of the semiconductor integrated circuit 100 shown in FIG. 1.

As shown in FIG. 2, the energization signaling circuit "TD", the phase adjusting circuit "PC", the determining circuit "GC" and the comparator "COM" are low-voltage ICs and operate on the control voltage (5V, for example) supplied from the control power supply "VDD1".

As shown in FIG. 2, the first diode "D1", the second "D2", the drive circuit "DR" and the bridge circuit "BR" are high-voltage ICs and operate on a direct-current voltage (280V, for example) higher than the control voltage "VDD1" supplied from the direct-current power supply "VDD2".

Since the first diode "D1" and the second diode "D2" required for the current polarity determination are connected as described above, the input voltage to the comparator "COM" falls within an in-phase input voltage range even if the voltage across the negative-side transistor "Trb" is negative.

Since the high-voltage ICs includes the diodes required for determination of the polarity of the motor current, the high-voltage ICs can be used with a wide range of power supply voltages.

In a case where the semiconductor integrated circuit 100 is used at a low voltage of 80V or less, for example, the low-voltage circuit part and the high-voltage circuit part can be formed by a single chip, such as a double-diffused MOSFET (DMOS).

Figure 3:
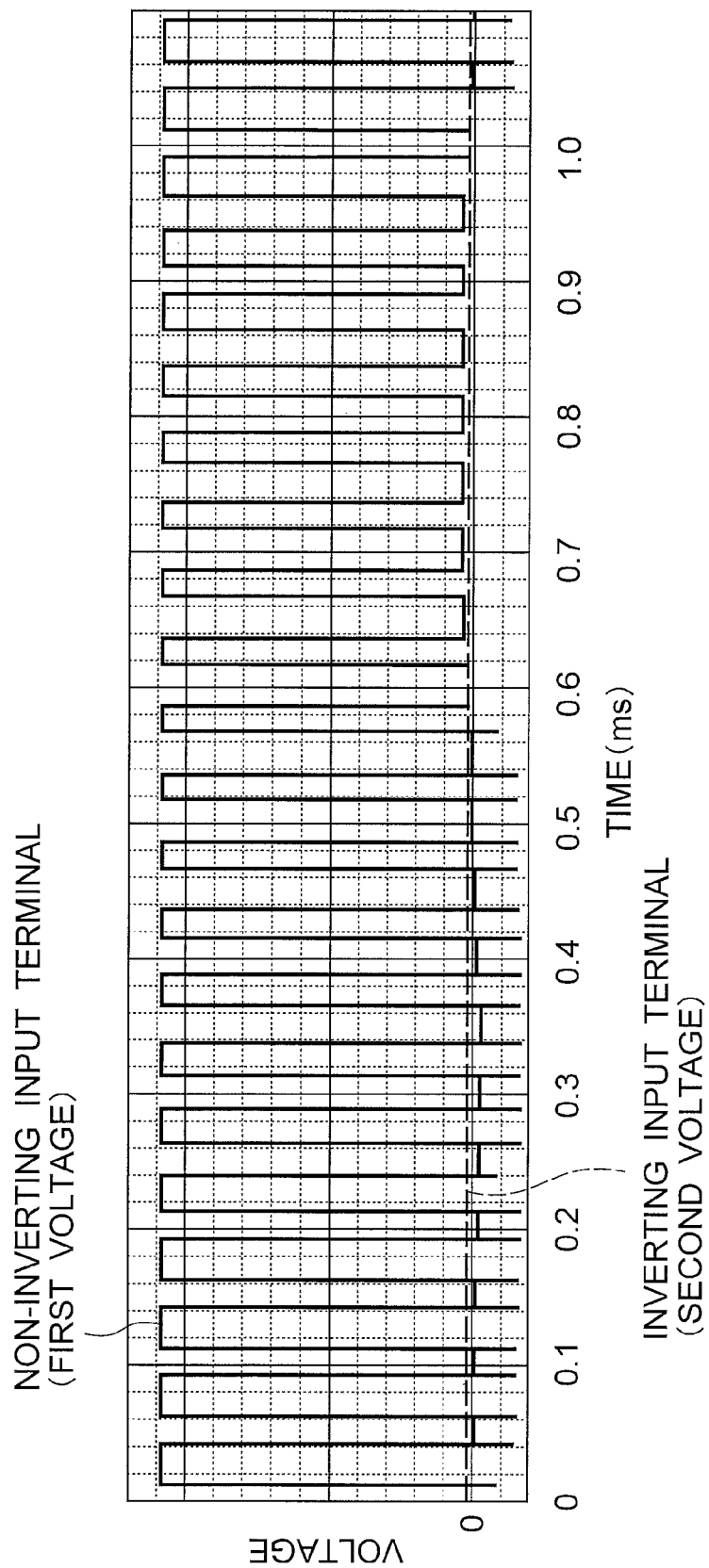
FIG. 3 is a waveform diagram showing examples of waveforms of the first voltage "V1" and the second voltage "V2" input to the comparator "COM" shown in FIG. 1.
Figure 4:
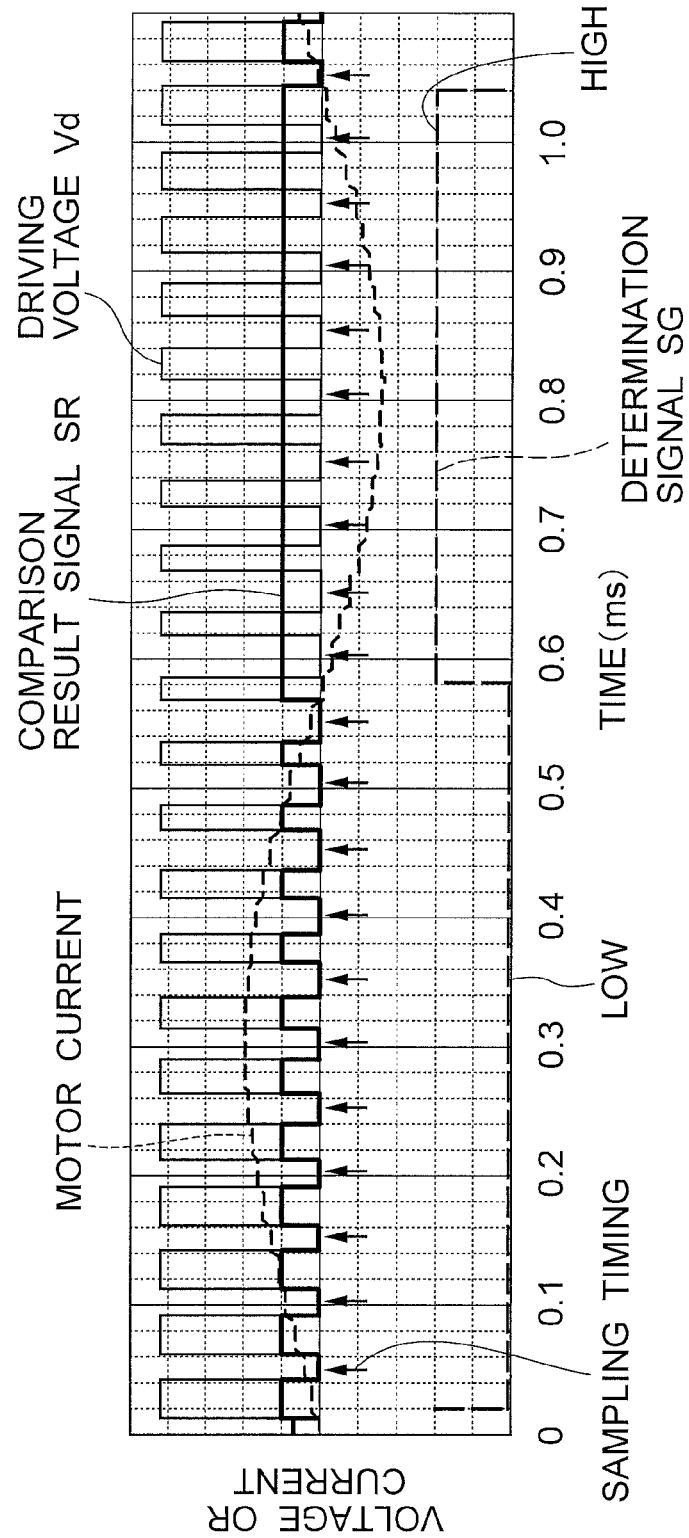
FIG. 4 is a waveform diagram showing examples of waveforms of the comparison result signal "SR" output from the comparator "COM" in response to the first voltage "V1" and the second voltage "V2" shown in FIG. 3, the determination signal "SG" output from the determining circuit "GC" in response to the comparison result signal "SR", the driving voltage "Vd" and the motor current.

Next, an example of an operation of the semiconductor integrated circuit 100 configured as described above will be described. FIG. 3 is a waveform diagram showing examples of waveforms of the first voltage "V1" and the second voltage "V2" input to the comparator "COM" shown in FIG. 1. FIG. 4 is a waveform diagram showing examples of waveforms of the comparison result signal "SR" output from the comparator "COM" in response to the first voltage "V1" and the second voltage "V2" shown in FIG. 3, the determination signal "SG" output from the determining circuit "GC" in response to the comparison result signal "SR", the driving voltage "Vd" and the motor current.

As shown in FIGS. 3 and 4, for example, in a period from 0.02 ms to 0.58 ms, the first voltage "V1" is lower than the second voltage "V2" at a time of sampling prescribed by the sampling signal "SL" (during the period in which the negative-side transistor "Trb" is in the on state), the comparator "COM" outputs the comparison result signal "SR" at the "Low" level.

Since the sampled comparison result signal "SR" prescribes that the first voltage "V1" is lower than the second voltage "V2" (that is, the comparison result signal "SR" is at the "Low" level, for example), the determining circuit "GC" determines that the motor current is of the positive polarity and flows from the negative-side transistor "Trb" to the energization terminal "Tx" (and outputs the determination signal "SG" at the "Low" level).

On the other hand, in a period from 0.58 ms to 1.04 ms, the first voltage "V1" is equal to or higher than the second voltage "V2" at a time of sampling prescribed by the sampling signal "SL" (during the period in which the negative-side transistor "Trb" is in the on state) as shown in FIGS. 3 and 4, the comparator "COM" outputs the comparison result signal "SR" at the "High" level.

Since the sampled comparison result signal "SR" prescribes that the first voltage "V1" is equal to or higher than the second voltage "V2" (that is, the comparison result signal "SR" is at the "High" level, for example), the determining circuit "GC" determines that the motor current is of the negative polarity and flows from the energization terminal "Tx" to the negative-side transistor "Trb" (and outputs the determination signal "SG" at the "High" level).

In this embodiment, as described above, the phase of the position detection signal "SH" is in synchronization with the phase of the induced voltage of the coils of the brushless motor "M".

In a case where the phase control signal "SP" is zero (reference value) or not input, the phase adjusting circuit "PC" makes an adjustment so that the position detection signal "SH" and the determination signal "SG" are in synchronization with each other.

More specifically, in a case where the determination signal "SG" lags behind the position detection signal "SH", the phase adjusting circuit "PC" adjusts the phase of the driving voltage "Vd" prescribed by the phase adjustment signal "Sx" in the advance direction. On the other hand, in a case where the determination signal "SG" leads the position detection signal "SH", the phase adjusting circuit "PC" adjusts the phase of the driving voltage "Vd" prescribed by the phase adjustment signal "Sx" in the delay direction.

As a result, the phase adjusting circuit "PC" outputs the phase adjustment signal "Sx" that adjusts the phase of the driving voltage "Vd" so that the phase of the motor current agrees with the phase of the induced voltage.

The energization signaling circuit "TD" then outputs the energization signal "SC" responsive to the phase adjustment signal "Sx". In response to the energization signal "SC", the drive circuit "DR" performs PWM control on the bridge circuit "BR" with the PWM control signal "SPWM" to make the bridge circuit "BR" output the driving voltage "Vd" so that the phase of the motor current agrees with the phase of the induced voltage.

In this way, the phase of the energization signal "SC" from the energization signaling circuit "TD" is adjusted with the phase adjustment signal "Sx", the phase of the induced voltage agrees with the phase of the motor current, and the brushless motor "M" is driven at a maximum efficiency.

In a case where the phase control signal "SP" is negative (lower than the reference value), for example, the phase adjusting circuit "PC" outputs the phase adjustment signal "Sx" that prescribes that the phase of the driving voltage "Vd" is adjusted in the advance direction, regardless of the phase difference between the position detection signal "SH" and the determination signal "SG".

On the other hand, in a case where the phase control signal "SP" is positive (higher than the reference value), the phase adjusting circuit "PC" outputs the phase adjustment signal "Sx" that prescribes that the phase of the driving voltage "Vd" is adjusted in the delay direction.

In an application where the load on the brushless motor "M" is light at high speed, for example, in a case where the number of revolutions is insufficient even though the command signal "SV" prescribes the maximum voltage, the phase control signal "SP" is set negative. This allows a so-called field weakening control and a faster control.

As described above, the motor driving apparatus 1000 according to the first embodiment can be improved in efficiency.

In particular, the semiconductor integrated circuit 100 does not need any external component and does not have even a current detecting resistor, so that the current consumption of the bridge circuit "BR" can be reduced.

Second Embodiment

Figure 5:
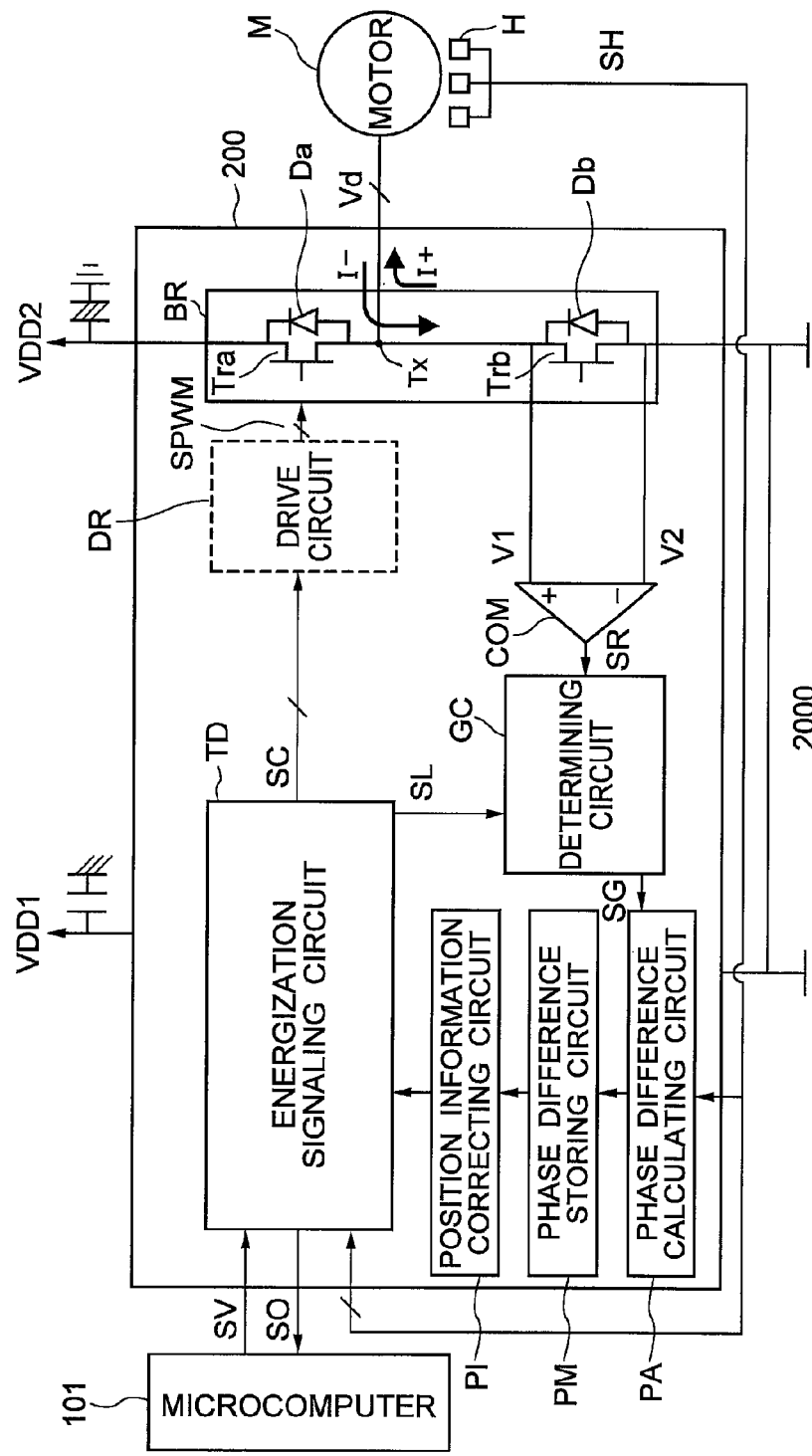
FIG. 5 is a diagram showing an example of a configuration of a motor driving apparatus 2000 according to a second embodiment.

FIG. 5 is a diagram showing an example of a configuration of a motor driving apparatus 2000 according to a second embodiment. In FIG. 5, the same reference numerals as those in FIG. 1 denote the same components as those in the first embodiment.

As shown in FIG. 5, the motor driving apparatus 2000 includes a brushless motor "M", a semiconductor integrated circuit (controlling circuit) 200, and a position sensor "H" provided on the brushless motor "M".

A microcomputer 101 is configured to output a command signal "SV" that prescribes driving of the brushless motor "M" to the semiconductor integrated circuit 200.

Based on a position detection signal "SH" and the command signal "SV" that prescribes driving of the brushless motor "M", the semiconductor integrated circuit 200 supplies, at an energization terminal "Tx", a driving voltage "Vd" in the shape of a pseudo sinusoidal wave to a coil of the brushless motor "M", thereby controlling driving of the brushless motor "M".

As shown in FIG. 5, the semiconductor integrated circuit 200 includes a phase difference calculating circuit (phase calculating means) "PA", a position information correcting circuit (position information correcting means) "PI", phase difference storing means "PM", an energization signaling circuit (energization signaling means) "TD", a driving circuit "DR", a bridge circuit (driving voltage outputting means) "BR", a comparator "COM" and a determining circuit (determining means) "GC", for example.

The energization signaling circuit "TD" outputs an energization signal "SC" that controls energization of the brushless motor "M" based on the position detection signal "SH" and the command signal "SV".

The energization signaling circuit "TD" forms an energization signal "SC" in the shape of a sinusoidal wave by reading sinusoidal wave data, for example, from the position detection signal "SH" and the command signal "SV". The sinusoidal wave data may be three-phase modulated data or two-phase modulated data.

For higher efficiency of the brushless motor "M", for example, the energization signaling circuit "TD" outputs the energization signal "SC" that adjusts the phase of the driving voltage "Vd" so as to make the phase of a motor current and the phase of an induced voltage agree with each other.

In response to the energization signal "Sc", the driving circuit "DR" provides a PWM controlling signal "SPWM" to PWM-control the bridge circuit "BR" to make the bridge circuit "BR" output the driving voltage "Vd" so as to make the phase of the motor current and the phase of the induced voltage agree with each other.

For high-speed operation, the energization signaling circuit "TD" outputs the energization signal "SC" that adjusts the phase of the driving voltage "Vd" so as to advance the phase of the motor current with respect to the phase of the induced voltage.

In response to the energization signal "Sc", the driving circuit "DR" provides a PWM controlling signal "SPWM" to PWM-control the bridge circuit "BR" to make the bridge circuit "BR" output the driving voltage "Vd" so as to advance the phase of the motor current with respect to the phase of the induced voltage.

In addition, based on the position detection signal "SH", the energization signaling circuit "TD" outputs a rotation signal "SO" including information on the presence or absence of a rotation of the brushless motor "M" and the number of rotations.

Furthermore, in a period when a positive-side transistor "Tra" and a negative-side transistor "Trb" are in the off state while the brushless motor "M" is rotating, the energization signaling circuit "TD" outputs a sampling signal "SL" that instructs sampling of a comparison result signal "SR" to the determining circuit "GC".

As shown in FIG. 5, a first input (non-inverting input terminal) of the comparator "COM" is connected to one end (drain) of the negative-side transistor "Trb", and a second input (inverting input terminal) of the comparator "COM" is connected to another end (source) of the negative-side transistor "Trb".

Therefore, the comparator "COM" receives a first voltage "V1", which is based on the voltage at the one end (drain) of the negative-side transistor "Trb", at the first input (non-inverting input terminal) and a second voltage "V2", which is based on the voltage at the another end (source) of the negative-side transistor "Trb", at the second input (inverting input terminal). The comparator "COM" outputs a comparison result signal "SR" that is based on the result of comparison between the first voltage "V1" and the second voltage "V2".

When the positive-side transistor "Tra" and the negative-side transistor "Trb" are in the off state while the brushless motor "M" is rotating, if the induced voltage in the coil (voltage at the energization terminal "Tx") is of the negative polarity, the first voltage "V1" is lower than the second voltage "V2". In this case, the comparator "COM" outputs a comparison result signal "SR" at a "Low" level, for example.

When the positive-side transistor "Tra" and the negative-side transistor "Trb" are in the off state while the brushless motor "M" is rotating, if the induced voltage in the coil is of the positive polarity, the first voltage "V1" is equal to or higher than the second voltage "V2". In this case, the comparator "COM" outputs a comparison result signal "SR" at a "High" level, for example.

As described above, the comparison result signal "SR" output from the comparator "COM" depends on the polarity of the induced voltage in the coil.

The comparator "COM" may have hysteresis characteristics in order to avoid a hunting phenomenon.

As shown in FIG. 5, the determining circuit "GC" determines the polarity of the induced voltage in the coil of the brushless motor "M" based on the comparison result signal "SR", and outputs a determination signal "SG" whose phase depends on the determined polarity.

In particular, the determining circuit "GC" determines the polarity of the induced voltage in the coil (voltage at the energization terminal "Tx") based on the comparison result signal "SR" output from the comparator "COM" in the period when the positive-side transistor "Tra" and the negative-side transistor "Trb" are in the off state while the brushless motor "M" is rotating.

Next, referring to FIG. 5, consider a case where the energization signaling circuit "TD" described above outputs the sampling signal "SL" that instructs sampling of the comparison result signal "SR" to the determining circuit "GC" in a period when the negative-side transistor "Trb" is in the on state, for example.

In response to the sampling signal "SL", the determining circuit "GC" samples the comparison result signals "SR".

If the sampled comparison result signal "SR" indicates that the first voltage "V1" is lower than the second voltage "V2"

(if the sampled comparison result signal "SR" is at the "Low" level, for example), the determining circuit "GC" determines that the induced voltage in the coil (voltage at the energization terminal "Tx") is of the negative polarity.

In this case, the determining circuit "GC" outputs a determination signal "SG" at the "High" level, for example.

If the sampled comparison result signal "SR" indicates that the first voltage "V1" is equal to or higher than the second voltage "V2" (if the sampled comparison result signal "SR" is at the "High" level, for example), the determining circuit "GC" determines that the induced voltage in the coil (voltage at the energization terminal "Tx") is of the positive polarity.

In this case, the determining circuit "GC" outputs a determination signal "SG" at the "Low" level, for example.

The phase difference calculating circuit "PA" receives the position detection signal "SH" and the determination signal "SG".

The phase difference calculating circuit "PA" calculates the phase difference between the position detection signal "SH" and the determination signal "SG".

The phase difference storing circuit "PM" stores the phase difference calculated by the phase difference calculating circuit "PA". The phase difference storing circuit "PM" is a nonvolatile storage device (such as a NAND flash memory), for example.

Based on the difference between the calculated phase difference and a preset reference value, the position information correcting circuit "PI" determines the amount of correction for the phase of the driving voltage "Vd". In this example, the amount of correction for the phase of the driving voltage "Vd" is the difference between the calculated phase difference and the preset reference value.

In this way, the position information correcting circuit "PI" corrects information on the rotational position of a rotor of the brushless motor "M".

The reference value described above is determined based on the phase difference in electrical angle between the position of the coil of the brushless motor "M" and a normal position of the position sensor "H" that detects the induced voltage in the coil.

The energization signaling circuit "TD" outputs the energization signal "SC" that corrects the phase of the driving voltage "Vd" to bring the difference between the phase difference calculated by the phase difference calculating circuit "PA" and the reference value closer to zero.

As a result, the effect of the position of attachment of the brushless motor "M" on the position sensor "H" is reduced, and the precision of detection of the position of the rotor of the brushless motor "M" is improved.

The remainder of the configuration of the motor driving apparatus 2000 is the same as that of the motor driving apparatus 1000 shown in FIG. 1.

Next, an example of operational characteristics of the motor driving apparatus 2000 configured as described above will be described.

Figure 6:
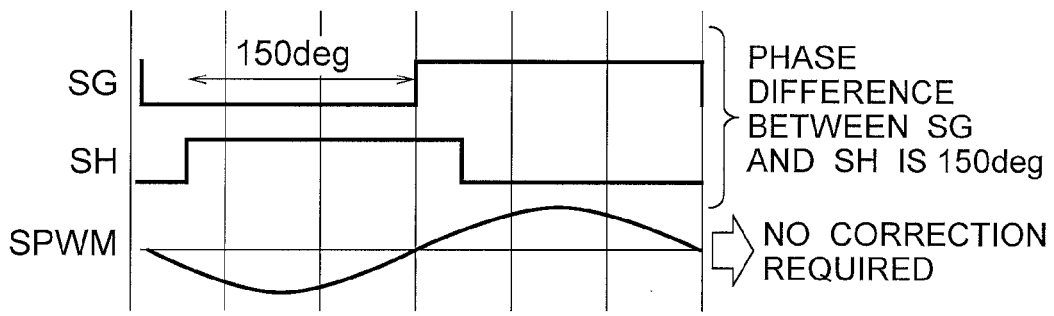
FIG. 6 is a diagram showing an example of a phase relationship between the position detection signal "SH", the determination signal "SG" and the PWM controlling signal "SPWM" in a case where the position sensor "H" is attached at the normal position on the brushless motor "M"
Figure 7:
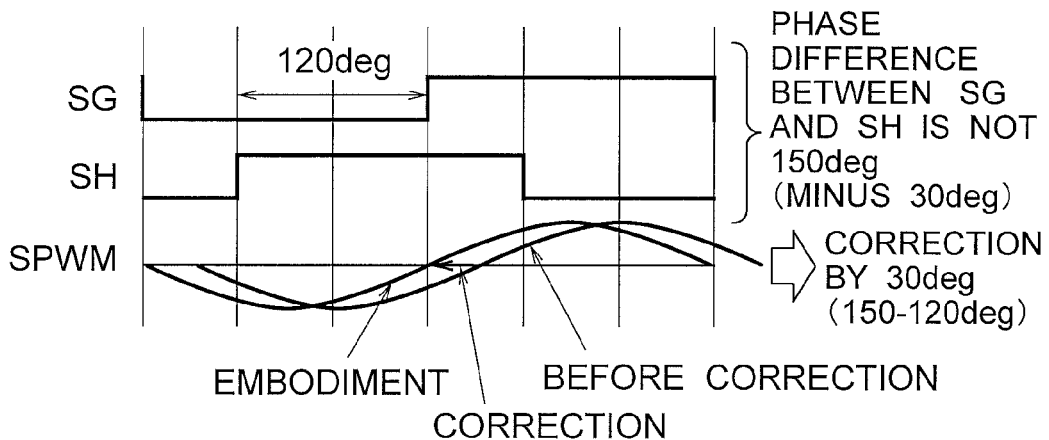
FIG. 7 is a diagram showing an example of the phase relationship between the position detection signal "SH", the determination signal "SG" and the PWM controlling signal "SPWM" in a case where the position sensor "H" is not attached at the normal position on the brushless motor "M"
Figure 8:
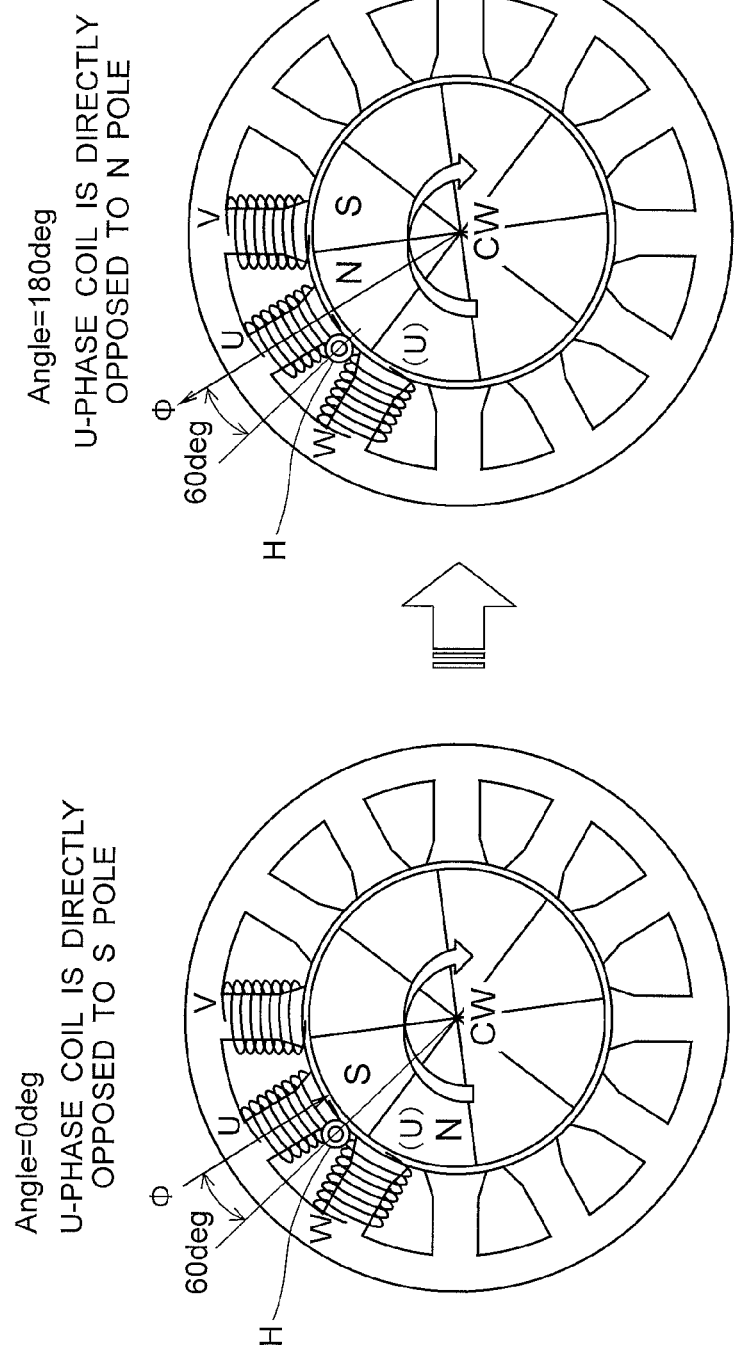
FIG. 8 is a diagram showing an example of a positional relationship between a flux linkage of the coil of a stator, the position sensor "H" and magnetic poles of the rotor in a case where the brushless motor "M" is rotating clockwise.
Figure 9:
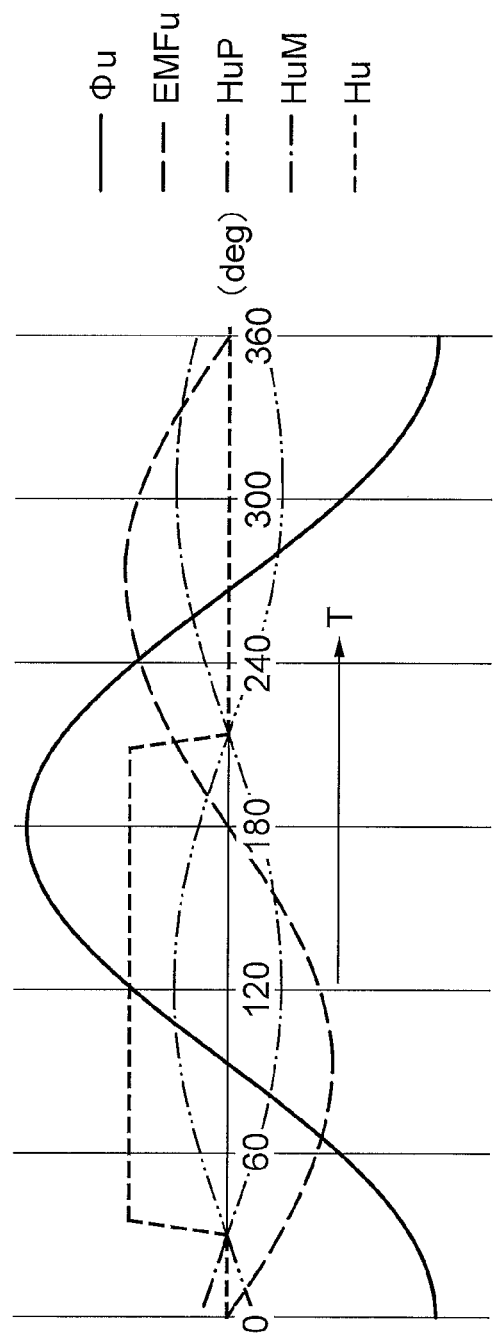
FIG. 9 is a diagram showing an example of waveforms of signals in the case where the brushless motor "M" is rotating clockwise shown in FIG. 8.

FIG. 6 is a diagram showing an example of a phase relationship between the position detection signal "SH", the determination signal "SG" and the PWM controlling signal "SPWM" in a case where the position sensor "H" is attached at the normal position on the brushless motor "M". FIG. 7 is a diagram showing an example of the phase relationship between the position detection signal "SH", the determination signal "SG" and the PWM controlling signal "SPWM" in a case where the position sensor "H" is not attached at the normal position on the brushless motor "M". FIG. 8 is a diagram showing an example of a positional relationship between a flux linkage of the coil of a stator, the position sensor "H" and magnetic poles of the rotor in a case where the brushless motor "M" is rotating clockwise. FIG. 9 is a diagram showing an example of waveforms of signals in the case where the brushless motor "M" is rotating clockwise shown in FIG. 8.

In the case where the brushless motor "M" is rotating clockwise as shown in FIGS. 8 and 9, for example, a Hall signal "Hup" of the position sensor "H" is advanced by 60 degrees with respect to a flux linkage Φu of a U-phase coil. An induced voltage "EMFu" in the U-phase coil lags behind the flux linkage Φu by $\pi/2$. Therefore, the induced voltage "EMFu" in the U-phase coil lags behind a signal "Hu" (the position detection signal "SH") that corresponds to the Hall signal "Hup" by 150 degrees.

In short, in the case where the position sensor "H" is attached at the normal position on the brushless motor "M", the phase difference between the determination signal "SG" and the position detection signal "SH" is 150 degrees (which depends on the reference value described above). In this case, the amount of correction for the phase of the driving voltage "Vd" is zero, and no correction is required (see FIG. 6).

In the case where the position sensor "H" is displaced from the normal position on the brushless motor "M", the phase difference between the determination signal "SG" and the position detection signal "SH" is 120 degrees, for example. In this case, the amount of correction for the phase of the driving voltage "Vd" is 30 degrees (150 degrees minus 120 degrees), and this amount of correction is performed (see FIG. 7).

Figure 10:
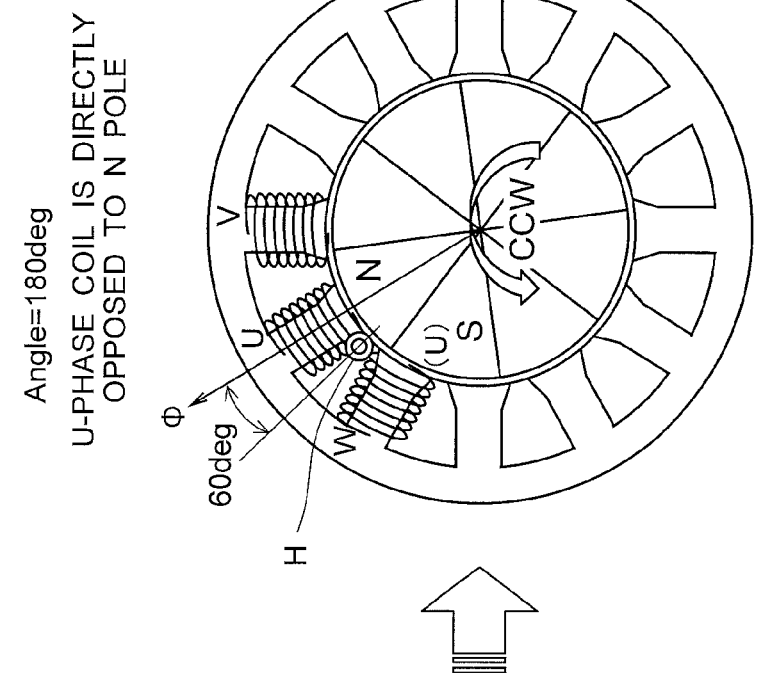
FIG. 10 is a diagram showing an example of a positional relationship between a flux linkage of the coil of the stator, the position sensor "H" and magnetic poles of the rotor in a case where the brushless motor "M" is rotating counterclockwise.
Figure 10:
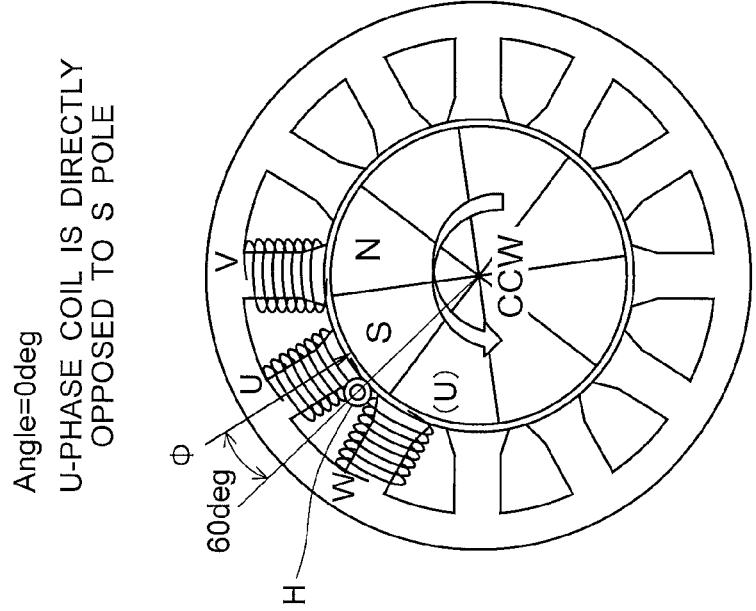
Figure 11:
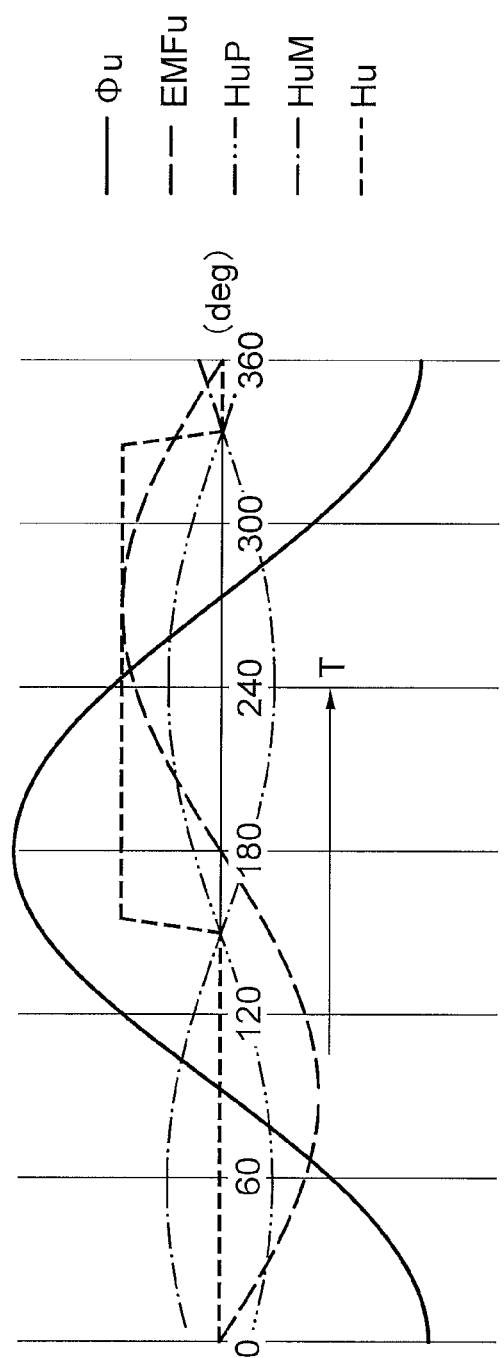
FIG. 11 is a diagram showing an example of waveforms of signals in the case where the brushless motor "M" is rotating counterclockwise shown in FIG. 10.

FIG. 10 is a diagram showing an example of a positional relationship between a flux linkage of the coil of the stator, the position sensor "H" and magnetic poles of the rotor in a case where the brushless motor "M" is rotating counterclockwise. FIG. 11 is a diagram showing an example of waveforms of signals in the case where the brushless motor "M" is rotating counterclockwise shown in FIG. 10.

In the case where the brushless motor "M" is rotating counterclockwise as shown in FIGS. 10 and 11, the Hall signal "Hup" of the position sensor "H" lags behind the flux linkage Φu of the U-phase coil by 60 degrees. The induced voltage "EMFu" in the U-phase coil is advanced by $\pi/2$ with respect to the flux linkage Φu. Therefore, the induced voltage "EMFu" in the U-phase coil lags behind the signal "Hu" (the position detection signal "SH") that corresponds to the Hall signal "Hup" by 30 degrees.

In short, in the case where the position sensor "H" is attached at the normal position on the brushless motor "M", the phase difference between the determination signal "SG" and the position detection signal "SH" is 30 degrees (which depends on the reference value described above). In this case, the amount of correction for the phase of the driving voltage "Vd" is zero, and no correction is required.

In the case where the position sensor "H" is displaced from the normal position on the brushless motor "M", the phase of the driving voltage "Vd" is corrected by an amount of correction that is determined based on the phase difference between the determination signal "SG" and the position detection signal "SH".

Although only signals involved with the U-phase coil have been described in the example shown in FIGS. 6 to 10, the same holds true for the W-phase coil and the V-phase coil.

As described above, the motor driving apparatus 2000 according to the second embodiment is improved in precision of detecting the position of the rotor of the brushless motor "M" and therefore is improved in efficiency.

In particular, precision requirements for sensor attachment on the motor driving apparatus 2000 are relaxed, and the manufacturing cost of the motor driving apparatus 2000 is reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A motor driving apparatus, comprising:
    a brushless motor;
    a position sensor that outputs a position detection signal in synchronization with a phase of an induced voltage of a coil of the brushless motor; and
    a semiconductor integrated circuit that controls driving of the brushless motor by supplying a pseudo sine-wave driving voltage from an energization terminal to the coil of the brushless motor based on the position detection signal and a command signal that prescribes driving of the brushless motor,
    wherein the semiconductor integrated circuit comprises:
    energization signal circuit that outputs an energization signal that controls energization of the brushless motor;
    driving voltage outputting circuit that has a positive-side transistor connected to a direct-current power supply at a first end of a current path thereof and to the energization terminal at a second end of the current path thereof, a positive-side diode connected to the first end of the current path of the positive-side transistor at a cathode thereof and to the second end of the current path of the positive-side transistor at an anode thereof, a negative-side transistor connected to the energization terminal at a first end of a current path thereof and to a ground at a second end of the current path thereof and a negative-side diode connected to the first end of the current path of the negative-side transistor at a cathode thereof and to the second end of the current path of the negative-side transistor at an anode thereof, and controls the positive-side transistor and the negative-side transistor so that the positive-side transistor and the negative-side transistor are turned on and off in a complementary manner in response to the energization signal to supply the pseudo sine-wave driving voltage to the coil of the brushless motor from the energization terminal;
    a comparator that receives a first voltage that is based on a voltage at the first end of the current path of the negative-side transistor at a first input and a second voltage that is based on a voltage at the second end of the current path of the negative-side transistor at a second input and outputs a comparison result signal that is based on a result of comparison between the first voltage and the second voltage;
    determining circuit that determines a polarity of a motor current flowing through the negative-side transistor based on the comparison result signal and outputs a determination signal; and
    phase adjusting circuit that outputs a phase adjustment signal that adjusts a phase of the driving voltage based on the position detection signal and the determination signal.

2. The motor driving apparatus according to claim 1, wherein the energization signaling circuit
    outputs a sampling signal that instructs to sample the comparison result signal to the determining circuit during a period in which the negative-side transistor is in an on state, and
    the determining circuit
    samples the comparison result signal in response to the sampling signal.

3. The motor driving apparatus according to claim 1, wherein the determining circuit
    determines that the motor current is of a positive polarity and flows from the negative-side transistor to the energization terminal in a case where the comparison result signal prescribes that the first voltage is lower than the second voltage, and
    determines that the motor current is of a negative polarity and flows from the energization terminal to the negative-side transistor in a case where the comparison result signal prescribes that the first voltage is equal to or higher than the second voltage.

4. The motor driving apparatus according to claim 1, wherein the phase adjusting circuit
    obtains a phase of the motor current from a zero crossing point at which the polarity of the motor current is inverted.

5. The motor driving apparatus according to claim 1, wherein the phase adjusting circuit
    obtains a phase of the motor current based on the determination signal,
    obtains the phase of the induced voltage based on the position detection signal, and
    outputs the phase adjustment signal that adjusts the phase of the driving voltage so that the phase of the motor current and the phase of the induced voltage agree with each other.

6. The motor driving apparatus according to claim 1, wherein the phase adjusting circuit
    outputs the phase adjustment signal that adjusts the phase of the driving voltage so that the phase of the motor current leads the phase of the induced voltage.

7. The motor driving apparatus according to claim 1, wherein the energization signaling circuit, the phase adjusting circuit, the determining circuit and the comparator operate on a third voltage supplied thereto, and
    the driving voltage outputting circuit operates on a fourth voltage supplied thereto that is higher than the third voltage.

8. The motor driving apparatus according to claim 1, wherein the semiconductor integrated circuit further comprises:
    a first resistor connected to a control power supply at a first end thereof and to the first input of the comparator at a second end thereof;
    a second resistor connected to the control power supply at a first end thereof and to the second input of the comparator at a second end thereof;
    a first diode connected to the first input of the comparator at an anode thereof and to the first end of the current path of the negative-side transistor at a cathode thereof; and
    a second diode connected to the second input of the comparator at an anode thereof and to the second end of the current path of the negative-side transistor at a cathode thereof.

9. The motor driving apparatus according to claim 1, wherein the first input of the comparator is a non-inverting input terminal, and the second input of the comparator is an inverting input terminal.

10. The motor driving apparatus according to claim 1, wherein the positive-side transistor and the negative-side transistor are MOS transistors or bipolar transistors.

11. A semiconductor integrated circuit that is incorporated in a motor driving apparatus that comprises a brushless motor and a position sensor that outputs a position detection signal in synchronization with a phase of an induced voltage of a coil of the brushless motor, and controls driving of the brushless motor by supplying a pseudo sine-wave driving voltage from an energization terminal to the coil of the brushless motor based on the position detection signal and a command signal that prescribes driving of the brushless motor, the semiconductor integrated circuit comprising:
energization signal circuit that outputs an energization signal that controls energization of the brushless motor;
driving voltage outputting circuit that has a positive-side transistor connected to a direct-current power supply at a first end of a current path thereof and to the energization terminal at a second end of the current path thereof, a positive-side diode connected to the first end of the current path of the positive-side transistor at a cathode thereof and to the second end of the current path of the positive-side transistor at an anode thereof, a negative-side transistor connected to the energization terminal at a first end of a current path thereof and to a ground at a second end of the current path thereof and a negative-side diode connected to the first end of the current path of the negative-side transistor at a cathode thereof and to the second end of the current path of the negative-side transistor at an anode thereof, and controls the positive-side transistor and the negative-side transistor so that the positive-side transistor and the negative-side transistor are turned on and off in a complementary manner in response to the energization signal to supply the pseudo sine-wave driving voltage to the coil of the brushless motor from the energization terminal;
a comparator that receives a first voltage that is based on a voltage at the first end of the current path of the negative-side transistor at a first input and a second voltage that is based on a voltage at the second end of the current path of the negative-side transistor at a second input and outputs a comparison result signal that is based on a result of comparison between the first voltage and the second voltage;
determining circuit that determines a polarity of a motor current flowing through the negative-side transistor based on the comparison result signal and outputs a determination signal; and
phase adjusting circuit that outputs a phase adjustment signal that adjusts a phase of the driving voltage based on the position detection signal and the determination signal.

12. The semiconductor integrated circuit according to claim 11, wherein the energization signaling circuit
outputs a sampling signal that instructs to sample the comparison result signal to the determining circuit during a period in which the negative-side transistor is in an on state, and
the determining circuit
samples the comparison result signal in response to the sampling signal.

13. The semiconductor integrated circuit according to claim 11, wherein the determining circuit
determines that the motor current is of a positive polarity and flows from the negative-side transistor to the energization terminal in a case where the comparison result signal prescribes that the first voltage is lower than the second voltage, and
determines that the motor current is of a negative polarity and flows from the energization terminal to the negative-side transistor in a case where the comparison result signal prescribes that the first voltage is equal to or higher than the second voltage.

14. The semiconductor integrated circuit according to claim 11, wherein the phase adjusting circuit
obtains a phase of the motor current from a zero crossing point at which the polarity of the motor current is inverted.

15. The semiconductor integrated circuit according to claim 11, wherein the phase adjusting circuit
obtains a phase of the motor current based on the determination signal,
obtains the phase of the induced voltage based on the position detection signal, and
outputs the phase adjustment signal that adjusts the phase of the driving voltage so that the phase of the motor current and the phase of the induced voltage agree with each other.

16. The semiconductor integrated circuit according to claim 11, wherein the phase adjusting circuit
outputs the phase adjustment signal that adjusts the phase of the driving voltage so that the phase of the motor current leads the phase of the induced voltage.

17. The semiconductor integrated circuit according to claim 11, wherein the energization signaling circuit, the phase adjusting circuit, the determining circuit and the comparator operate on a third voltage supplied thereto, and
the driving voltage outputting circuit operates on a fourth voltage supplied thereto that is higher than the third voltage.

18. The semiconductor integrated circuit according to claim 11, wherein the semiconductor integrated circuit further comprises:
a first resistor connected to a control power supply at a first end thereof and to the first input of the comparator at a second end thereof;
a second resistor connected to the control power supply at a first end thereof and to the second input of the comparator at a second end thereof;
a first diode connected to the first input of the comparator at an anode thereof and to the first end of the current path of the negative-side transistor at a cathode thereof; and
a second diode connected to the second input of the comparator at an anode thereof and to the second end of the current path of the negative-side transistor at a cathode thereof.

19. The semiconductor integrated circuit according to claim 11, wherein the first input of the comparator is a non-inverting input terminal, and
the second input of the comparator is an inverting input terminal.

20. A motor driving apparatus, comprising:
a brushless motor;
a position sensor that outputs a position detection signal in synchronization with the phase of an induced voltage in a coil of the brushless motor; and
a semiconductor integrated circuit that controls driving of the brushless motor by supplying, at an energization terminal thereof, a driving voltage in the shape of a pseudo sinusoidal wave to the coil of the brushless motor based on the position detection signal and a command signal that prescribes driving of the brushless motor, wherein the semiconductor integrated circuit comprises:
energization signaling circuit that outputs an energization signal that controls energization of the brushless motor;
driving voltage outputting circuit that has a positive-side transistor connected to a direct-current power supply at a first end of a current path thereof and to the energization terminal at a second end of the current path thereof, a positive-side diode connected to the first end of the current path of the positive-side transistor at a cathode thereof and to the second end of the current path of the positive-side transistor at an anode thereof, a negative-side transistor connected to the energization terminal at a first end of a current path thereof and to a ground at a second end of the current path thereof, a negative-side diode connected to the first end of the current path of the negative-side transistor at a cathode thereof and to the second end of the current path of the negative-side transistor at an anode thereof, and controls the positive-side transistor and the negative-side transistor in response to the energization signal so as to turn on and off the positive-side transistor and the negative-side transistor in a complementary manner to supply, at the energization terminal, the driving voltage in the shape of the pseudo sinusoidal wave to the coil of the brushless motor;

a comparator that receives a first voltage, which is based on a voltage at the first end of the current path of the negative-side transistor, at a first input thereof and a second voltage, which is based on a voltage at the second end of the current path of the negative-side transistor, at a second input thereof and outputs a comparison result signal that is based on a result of comparison between the first voltage and the second voltage;

determining circuit that determines a polarity of the induced voltage in the coil of the brushless motor based on the comparison result signal and outputs a determination signal whose phase depends on the determined polarity;

phase difference calculating circuit that calculates a phase difference between the position detection signal and the determination signal; and position information correcting circuit that prescribes an amount of correction for the phase of the driving voltage based on the calculated phase difference.

\* \* \* \* \*